(12) United States Patent
Layman, Jr. et al.

(10) Patent No.: US 8,802,787 B2
(45) Date of Patent: Aug. 12, 2014

(54) BROMINATION OF LOW MOLECULAR WEIGHT AROMATIC POLYMER COMPOSITIONS

(75) Inventors: William J. Layman, Jr., Baton Rouge, LA (US); Zhongxin Ge, Baton Rouge, LA (US); Arthur G. Mack, Prairieville, LA (US); Chi Hung Cheng, Baton Rouge, LA (US); Neal J. Colonius, Baton Rouge, LA (US); Sarah C. Jones, Baton Rouge, LA (US); Steven A. Anderson, Baton Rouge, LA (US)

(73) Assignee: Albemarle Corporation, Richmond, VA (US)

( * ) Notice: Subject to any disclaimer, the term of this patent is extended or adjusted under 35 U.S.C. 154(b) by 378 days.

(21) Appl. No.: 13/264,184

(22) PCT Filed: Apr. 29, 2010

(86) PCT No.: PCT/US2010/032937
§ 371 (c)(1),
(2), (4) Date: Oct. 13, 2011

(87) PCT Pub. No.: WO2010/127091
PCT Pub. Date: Nov. 4, 2010

(65) Prior Publication Data
US 2012/0053373 A1    Mar. 1, 2012

Related U.S. Application Data

(60) Provisional application No. 61/174,902, filed on May 1, 2009.

(51) Int. Cl.
*C08F 136/00*     (2006.01)
*C07C 17/00*     (2006.01)

(52) U.S. Cl.
USPC ........................................ 525/331.9; 570/206

(58) Field of Classification Search
USPC ........................................ 570/206; 525/331.9
See application file for complete search history.

(56) References Cited

U.S. PATENT DOCUMENTS

| | | |
|---|---|---|
| 2,243,543 A | 5/1941 | ter Horst |
| 2,757,146 A | 7/1956 | Fawcett |
| 2,914,489 A | 11/1959 | Hall |
| 2,954,412 A | 9/1960 | Wulf et al. |
| 3,221,068 A | 11/1965 | Gorham |
| 3,372,880 A | 3/1968 | O'Hara |
| 3,373,135 A | 3/1968 | Jenkner et al. |
| 3,451,988 A | 6/1969 | Langer, Jr. |
| 3,458,586 A | 7/1969 | Langer, Jr. |
| 3,536,679 A | 10/1970 | Langer, Jr. |
| 3,541,149 A | 11/1970 | Langer, Jr. |
| 3,594,396 A | 7/1971 | Langer, Jr. |
| 3,634,548 A | 1/1972 | Harwell et al. |
| 3,668,263 A | 6/1972 | Morrison et al. |
| 3,725,368 A | 4/1973 | Morrison et al. |
| 3,742,077 A | 6/1973 | Kamienski et al. |
| 3,751,384 A | 8/1973 | Langer, Jr. |
| 3,751,501 A | 8/1973 | Kamienski et al. |
| 3,850,882 A | 11/1974 | Underwood et al. |
| 3,943,195 A | 3/1976 | Naarmann et al. |
| 4,041,088 A | 8/1977 | Bach et al. |
| 4,074,032 A | 2/1978 | Naarmann et al. |
| 4,078,019 A | 3/1978 | Langer, Jr. |
| 4,107,231 A | 8/1978 | Wurmb et al. |
| 4,108,921 A | 8/1978 | Langer, Jr. |
| 4,129,551 A | 12/1978 | Rueter et al. |
| 4,129,705 A | 12/1978 | de Zarauz |
| 4,134,938 A | 1/1979 | Langer, Jr. |
| 4,137,212 A | 1/1979 | Theysohn et al. |
| 4,143,221 A | 3/1979 | Naarmann et al. |
| 4,151,223 A | 4/1979 | Neuberg et al. |
| 4,200,702 A | 4/1980 | Gausepohl et al. |
| 4,268,705 A | 5/1981 | Palmer |
| 4,311,818 A | 1/1982 | Sigwalt et al. |
| 4,360,455 A | 11/1982 | Lindenschmidt et al. |
| 4,435,312 A | 3/1984 | Lecolier et al. |
| 4,450,259 A | 5/1984 | Roggero et al. |
| 4,463,135 A | 7/1984 | Maly |
| 4,482,677 A | 11/1984 | Teranaka et al. |
| 4,535,135 A | 8/1985 | Lecolier et al. |
| 4,636,540 A | 1/1987 | Warfel |
| 4,701,498 A | 10/1987 | Roggero et al. |
| 4,734,461 A | 3/1988 | Roggero et al. |
| 4,753,745 A | 6/1988 | Kostusyk et al. |
| 4,755,573 A | 7/1988 | Aycock |
| 4,829,135 A | 5/1989 | Gunesin et al. |
| 4,853,440 A | 8/1989 | Roggero et al. |

(Continued)

FOREIGN PATENT DOCUMENTS

| | | |
|---|---|---|
| CN | 100369941 C | 2/2008 |
| DE | 1570376 | 7/1969 |
| DE | 1589700 | 7/1970 |
| DE | 2050009 | 5/1971 |
| DE | 2758781 | 7/1979 |
| DE | 19516563 A1 | 11/1996 |
| EP | 0000141 A1 | 1/1979 |
| EP | 0002514 B2 | 6/1979 |
| EP | 0277429 B1 | 8/1988 |
| EP | 0334715 B1 | 9/1989 |

(Continued)

OTHER PUBLICATIONS

Eberhardt, G. G., et al., "A Catalytic Telomerization Reaction of Ethylene with Aromatic Hydrocarbons", J. Org. Chem., vol. 29, 1964, pp. 2928-2932.

(Continued)

*Primary Examiner* — Jafar Parsa
(74) *Attorney, Agent, or Firm* — James A. Jubinsky

(57) ABSTRACT

Described is process technology for producing brominated aromatic polymer compositions from low molecular weight aromatic polymer compositions. The specified conditions used in the process enable the formation of products having superior color and thermal stability properties.

17 Claims, 1 Drawing Sheet

(56) References Cited

U.S. PATENT DOCUMENTS

| | | |
|---|---|---|
| 4,883,846 A | 11/1989 | Moore et al. |
| 4,950,721 A | 8/1990 | Dias et al. |
| 4,975,496 A | 12/1990 | Tigner et al. |
| 5,112,897 A | 5/1992 | Dever et al. |
| 5,112,898 A | 5/1992 | Dever et al. |
| 5,196,622 A | 3/1993 | Pettijohn et al. |
| 5,198,594 A | 3/1993 | Lillwitz et al. |
| 5,302,768 A | 4/1994 | Hussain |
| 5,310,858 A | 5/1994 | Greiner et al. |
| 5,326,836 A | 7/1994 | Hwang et al. |
| 5,457,248 A | 10/1995 | Mack et al. |
| 5,625,017 A | 4/1997 | Morita et al. |
| 5,637,650 A | 6/1997 | Gill et al. |
| 5,654,384 A | 8/1997 | Halasa et al. |
| 5,677,390 A | 10/1997 | Dadgar et al. |
| 5,686,538 A | 11/1997 | Balhoff et al. |
| 5,687,090 A | 11/1997 | Chen et al. |
| 5,728,782 A | 3/1998 | Brady et al. |
| 5,741,949 A | 4/1998 | Mack |
| 5,767,203 A | 6/1998 | Ao et al. |
| 5,852,131 A | 12/1998 | Balhoff et al. |
| 5,852,132 A | 12/1998 | Dadgar et al. |
| 5,902,865 A | 5/1999 | Gausepohl et al. |
| 5,916,978 A | 6/1999 | Ao et al. |
| 6,008,283 A | 12/1999 | Rose et al. |
| 6,025,450 A | 2/2000 | Lawson et al. |
| 6,093,211 A | 7/2000 | Hamielec et al. |
| 6,133,381 A | 10/2000 | Reed et al. |
| 6,207,765 B1 | 3/2001 | Ao et al. |
| 6,232,393 B1 | 5/2001 | Dadgar et al. |
| 6,232,408 B1 | 5/2001 | Dadgar et al. |
| 6,235,831 B1 | 5/2001 | Reed et al. |
| 6,235,844 B1 | 5/2001 | Dadgar et al. |
| 6,313,230 B1 | 11/2001 | Tsai et al. |
| 6,326,439 B1 | 12/2001 | Dadgar et al. |
| 6,348,166 B1 | 2/2002 | Knoll et al. |
| 6,355,194 B1 | 3/2002 | Agur et al. |
| 6,362,293 B1 | 3/2002 | Newman et al. |
| 6,521,714 B2 | 2/2003 | Kolich et al. |
| 6,657,028 B1 | 12/2003 | Aplin et al. |
| 6,759,498 B2 | 7/2004 | Ikematsu et al. |
| 6,767,960 B2 | 7/2004 | Bae et al. |
| 6,933,343 B2 | 8/2005 | Ikematsu et al. |
| 7,288,612 B2 | 10/2007 | Desbois et al. |
| 7,351,777 B2 | 4/2008 | Moore et al. |
| 7,425,290 B2 | 9/2008 | Semen |
| 7,632,893 B2 | 12/2009 | Kolich et al. |
| 2002/0035214 A1 | 3/2002 | Gill et al. |
| 2002/0183465 A1 | 12/2002 | Babcock et al. |
| 2005/0143526 A1 | 6/2005 | Faust et al. |
| 2005/0209408 A1 | 9/2005 | Lee et al. |
| 2006/0079644 A1 | 4/2006 | Meyer et al. |
| 2007/0004870 A1 | 1/2007 | Kolich et al. |
| 2007/0142566 A1 | 6/2007 | Kolich et al. |
| 2007/0185280 A1 | 8/2007 | Luther |
| 2007/0232759 A1 | 10/2007 | Chun et al. |
| 2010/0184941 A1 | 7/2010 | Layman, Jr. et al. |

FOREIGN PATENT DOCUMENTS

| | | |
|---|---|---|
| EP | 0741147 A1 | 11/1996 |
| EP | 0775719 A2 | 5/1997 |
| EP | 0806437 A1 | 11/1997 |
| GB | 1107898 | 3/1968 |
| GB | 1174845 | 12/1969 |
| GB | 1270318 | 4/1972 |
| GB | 1342101 | 12/1973 |
| GB | 1536762 | 12/1978 |
| GB | 1589700 | 5/1981 |
| GB | 2164051 A1 | 3/1986 |
| JP | 59-155454 | 9/1984 |
| JP | 62-042938 A | 2/1987 |
| JP | 08-188622 | 7/1996 |
| JP | 09-249705 A1 | 9/1997 |
| JP | 09-249706 A1 | 9/1997 |
| JP | 10-182730 A1 | 7/1998 |
| JP | 11-043511 A1 | 2/1999 |
| JP | 11-080220 A1 | 3/1999 |
| JP | 11-116613 A1 | 4/1999 |
| JP | 2001-341246 A1 | 12/2001 |
| WO | 90/15095 A1 | 12/1990 |
| WO | 99/25746 A1 | 5/1999 |
| WO | 99/55770 A1 | 11/1999 |
| WO | 00/15678 A1 | 3/2000 |
| WO | 02/072645 A1 | 9/2002 |
| WO | 2003/020826 A1 | 3/2003 |
| WO | 2005/118245 A1 | 12/2005 |
| WO | 2007/005233 A1 | 1/2007 |
| WO | 2007/076369 A1 | 7/2007 |
| WO | 2008/011477 A1 | 1/2008 |
| WO | 2008/066970 A1 | 6/2008 |
| WO | 2008/154453 A1 | 12/2008 |
| WO | 2008/154454 A1 | 12/2008 |
| WO | 2009/148464 A1 | 12/2009 |
| WO | 2010/065462 A1 | 6/2010 |
| WO | 2010/065464 A1 | 6/2010 |
| WO | 2010/065467 A1 | 6/2010 |
| WO | 2010/065468 A1 | 6/2010 |
| WO | 2010/127072 A1 | 11/2010 |
| WO | 2010/127087 A1 | 11/2010 |
| WO | 2010/127091 A1 | 11/2010 |

OTHER PUBLICATIONS

Eberhardt, G. G., et al., "Telomerization Reactions Involving a N-Chelated Organo Lithium Catalyst", Polymer Preprints, 1972, vol. 13, pp. 667-671.

Feil, F., et al., "Benzyl Complexes of the Heavier Alkaline-Earth Metals: The First Crystal Structure of a Dibenzylstrontium Complex", Organometallics, 2001, vol. 20, pp. 4616-4622.

CAPLUS Abstract of Fujimoto, T., et al., "Preparation of monodisperse polystyrenes with high molecular weights", Polymer Journal, 1975, 7(3), pp. 397-401. 1 page.

Gatzke, A.L., "Chain Transfer in Anionic Polymerization. Determination of Chain-Transfer Constants by Using Carbon-14-Labeled Chain Transfer Agents", Journal of Polymer Science, Part A-1, 1969, vol. 7, pp. 2281-2292.

Science Direct Abstract of Helary, G., et al., "Etude de la polymerisation anionique du styrene en milieu non polaire, en presence de N,N,N',N' tetramethyl ethylene diamine", European Polymer Journal, 1978, vol. 14, issue 5, pp. 345-348. 1 page.

Hennion, G. F., et al., "The Polybromination of Alkylbenzenes", J. Am. Chem. Soc., 1946, vol. 68, issue 3, pp. 424-426.

Caplus Abstract of Ito, M., et al., "Synthesis of well-defined block copolymers containing poly(N-isopropylacrylamide) segment by anionic block copolymerization of N-methoxymethyl-N-isopropylacrylamide", Designed Monomers and Polymers, 2004, 7(1-2), pp. 11-24. 1 page.

Junkui, C., "Synthesis of Narrow Distribution Polystyrene in RLi-Ligand Complex Systems", Chemical Journal of Chinese Universities, 1989, vol. 10, No. 12, pp. 1246-1250. Abstract only translated.

CAPLUS Abstract of Kalnins, K., et al., "Electronic structure of complexes of benzyl anion and ion pairs with styrene", Vysokimolekulyarnye Soedineniya, Seriya A (1990), 32(2), 316-21. 1 page.

Lamneck, Jr., J. H., "Bromination of the Two Propylbenzenes and Three Butylbenzenes", J. Am. Chem. Soc., 1954, vol. 76, issue 4, pp. 1106-1107.

CAPLUS Abstract of Langer, A. W., Jr., "Reactions of Chelated Organolithium Compounds", Transactions of the New York Academy of Sciences, 1965, 27(7), pp. 741-747. 1 page.

Marechal, Jean-Marc, et al., "Stereoregulation in the anionic polymerization of styrene initiated by superbases", Polymer, 2003, vol. 44, pp. 7601-7607.

Marechal, Jean-Marc, et al., "Stereospecific anionic polymerization of styrene initiated by R2Mg/ROMt 'ate' complexes", Polymer, 2004, 45, pp. 4641-4646.

(56) References Cited

OTHER PUBLICATIONS

Maruoka, K., et al., "Novel Anionic Oligomerization by a New, Sequential Generation of Organolithium Compounds", Macromolecules, 1996, 29, pp. 3328-3329.

Milner, R., et al., "Anionic telomerization of butadiene with toluene and diphenylmethane: microstructure and molecular weight", Polymer, vol. 26, 1985, ppg. 1265-1267.

Mizuno, T., et al., "Second and Third Virial Coefficients of Polystyrene with Benzyl Ends near the Theta Point", Macromolecules, 2005, 38, pp. 4432-4437.

Advanced Organic Chemistry, Reactions, Mechanisms, and Structure, 4th Ed., Jerry Mar., J. Wiley & Sons, 1992, pp. 743-744.

Atkins, Physical Chemistry, P. W., 4th Ed., W. H. Freeman and Co., 1990, p. 800.

Baskaran, D., et al., "Effect of Chelation of the Lithium Cation on the Anionic Polymerization of Methyl Methacrylate Using Organolithium Initiators", Macromolecules, 1995, 28, pp. 7315-7317.

Bildmann, U. J., et al., "Synthesis and Structure of the Tmeda Adduct of a Dibenzyl Lithiate Anion Containing Four-Coordinate Lithium", Organometallics, 2001, 20, pp. 1689-1691.

CAPLUS Abstract of Chakrapani, S., et al., "Strategies for the controlled, living anionic polymerization of acrylic and methacrylic monomers and novel star polymers", Polymer Science, 1994, vol. 1, pp. 112-17. 1 page.

Concise, Polymeric Materials Encyclopedia, Editor-in-Chief, Joseph C. Salamone, CRC Press, 1999, pp. 1305-1307.

CAPLUS Abstract of Morton, M., "Homogeneous anionic polymerization. II. Molecular weight of polystyrene initiated by lithium alkyls", Journal of Polymer Science, 1963, Part A-1, pp. 461-474. 1 page.

CAPLUS Abstract of Narita, T., et al., "Reactivity of butyllithium-MeOCH2CH2OLi System as catalyst for copolymerization of styrene with 1,3-butadiene", Journal of Macromolecular Science, Chemistry, 1970, 4(2), pp. 277-294. 1 page.

Patterman, S. P., et al., "Pi Complexation in Ion Pair Bonding. The Structure of Benzyllithium Triethylenediamine", J. Am. Chem. Soc., 1970, 92:5, pp. 1150-1157.

Pines, H., et al., "Sodium-catalyzed side chain aralkylation of alkylbenzenes with Styrene", J. Am. Chem. Soc, 1958, vol. 80(22), pp. 6001-6004.

Pines, H., et al., "Sodium Catalyzed Reactions. II. Side-chain Ethylation of Alkyl Aromatic Hydrocarbons Catalyzed by Sodium", J. Am. Chem. Soc., 1955, vol. 77(3), pp. 554-559.

Reed, J. N., "Product Subclass 13: Benzyllithium Compounds and (Lithiomethyl)Hetarenes", Science of Synthesis, 2006 (vol date 2005), vol. 8A, pp. 329-355.

Seki, A., et al., "Crossed aldol reaction using cross-linked polymer-bound lithium dialkylamide", Tetrahedron, 2004, vol. 60, pp. 5001-5011.

Sorenson, W. R., et al., Preparative Methods of Polymer Chemistry, Interscience Publishers, Inc., 1961, pp. 198-200.

Strohmann, C., et al., "A Highly Diastereomerically Enriched Benzyllithium Compound: The Molecular Structure and the Stereochemical Course of Its Transformations", Organometallics, 2002, vol. 21, pp. 3079-3081.

Tsukahara, Y., et al., "Preparation and Characterization of alpha-benzyl-omega-vinylbenzyl Polystyrene Macromonomer", Polymer Journal, 1994, vol. 26, No. 9, pp. 1013-1018.

CAPLUS Abstract of Waack, R., et al., "Effects of lithium halides on the reactivity of organolithium compounds (in polymerization)", Chemistry & Industry, 1964, vol. 12, pp. 496-497. 1 page.

Waack, R., et al., "Reactivities of Organolithium Compounds in Tetrahydrofuran. I. as Vinyl Polymerization Initiators", J. Org. Chem., 1967, 32(11), pp. 3395-3399.

Wilhelm, D., et al., "Reactions of Polyanions Derived from Alkylbenzenes", J. Am. Chem. Soc., 1984, 106, pp. 361-367.

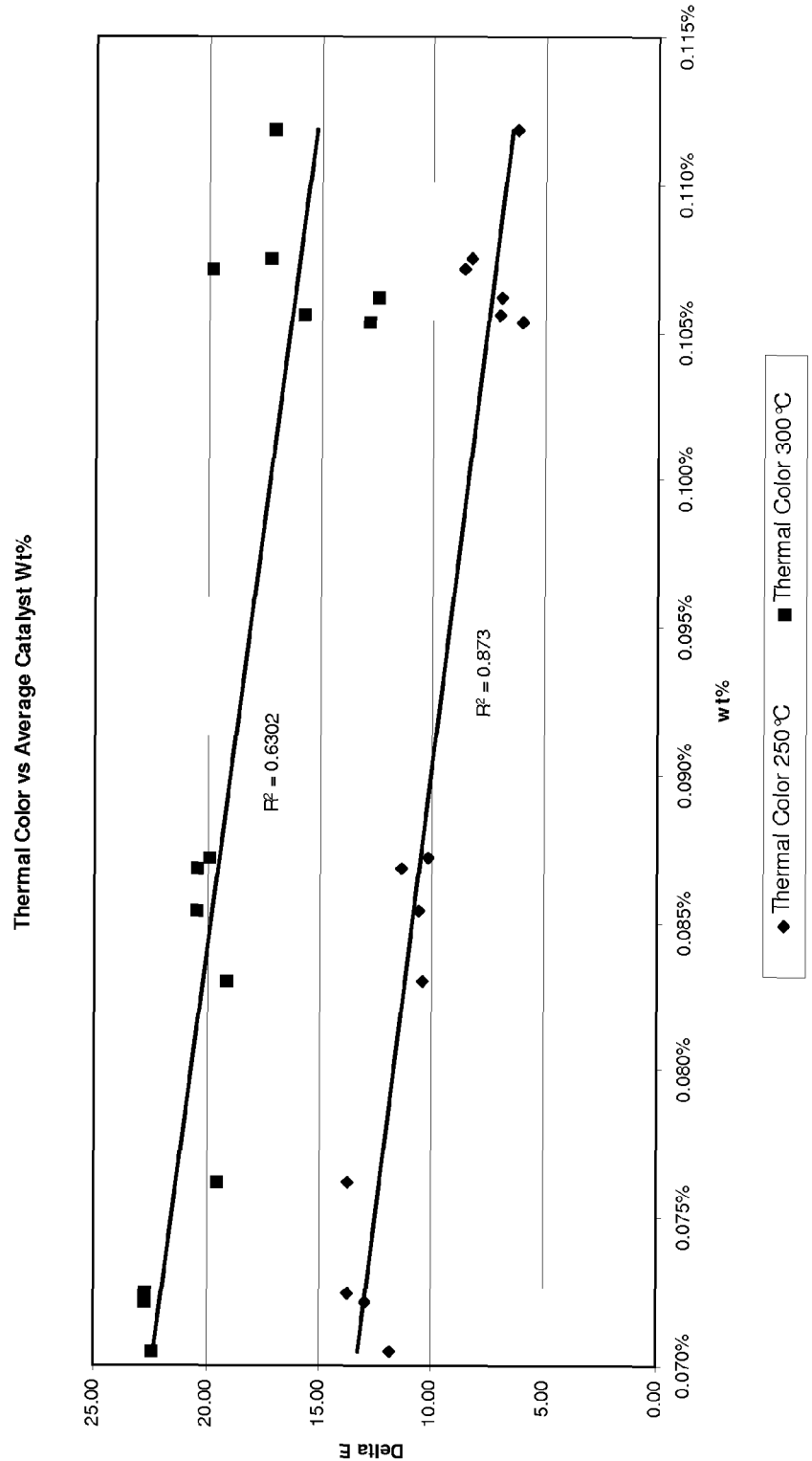

BROMINATION OF LOW MOLECULAR WEIGHT AROMATIC POLYMER COMPOSITIONS

REFERENCE TO RELATED APPLICATIONS

This application is the National Stage of International Patent Appl. No. PCT/US2010/032937 filed on Apr. 29, 2010, which in turn claims the benefit of U.S. Provisional Patent Appl. No. 61/174,902, filed on May 1, 2009, the disclosures of which are incorporated herein by reference.

BACKGROUND

A new highly-effective class of low molecular weight brominated aromatic polymer compositions has recently been discovered in our laboratories. These compositions have the formula:

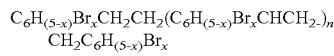

wherein n is an average number in the range of about 2.9 to about 3.9, wherein each x is the same or different and is a whole number in the range of 3 to 5, the average number of all of the x's in the composition being in the range of about 3.50 to about 3.80 and the weight percent of bromine as determined by X-Ray Fluorescence Spectroscopy (XRF) in the polymer being in the range of about 73.4 to about 74.5 wt %. A detailed description of these new brominated aromatic polymer compositions and their preparation and uses is presented in commonly-owned Provisional U.S. Patent Application No. 61/119,289, filed Dec. 2, 2008, all disclosure of which is incorporated herein by reference.

The process technology described in the foregoing Provisional patent application yields products having a combination of desirable properties. Nevertheless, it would be of advantage if still further improvements in the process technology could be found whereby the process would be even more efficient in terms of utilization of articles of commerce and reduced product quality sensitivity to recycle streams, in particular recycled bromination solvents. Additionally, it would be of advantage if these process improvements could be achieved without sacrifice of key flame retardant characteristics such as initial solution color, Hunter Color Yellowness Index, thermal color stability, and minimal thermal HBr content. Indeed, it would be of considerable advantage if one or more of these properties could be enhanced while achieving the foregoing further improvements in process technology.

This invention is deemed to have achieved most, if not all, of these objectives in a highly efficient and effective manner.

BRIEF NON-LIMITING SUMMARY OF THE INVENTION

This invention provides, among other things, a process which comprises brominating an aromatic polymer composition of the formula:

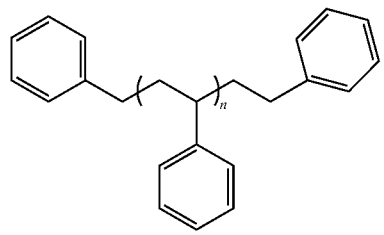

(I)

wherein for each molecule of formula (I), n is an average number in the range of about 2.5 to about 8 with the proviso that 1,3-diphenylpropane, a compound of formula (I) in which n is 0, optionally is present in this aromatic polymer composition in an amount of not more than about 1 GPC area %, and with the further proviso that this aromatic polymer composition optionally further contains toluene in an amount of not more than about 0.1 GPC area %, to form a brominated aromatic polymer composition having a bromine content as determined by XRF in the range of about 70 to about 76 wt %, which process comprises brominating said aromatic polymer composition with liquid bromine in the presence of an aluminum halide bromination catalyst and in the absence of light, at a bromination temperature in the range of about -10° C. to about +5° C., and in which the molar ratio of total amount of bromine fed:total amount of catalyst fed is in the range of 200:1 to about 500:1, which process is further characterized in that:

a) the total amount of said catalyst is charged into a reactor which is at a temperature in the range of about -25° C. to about 0° C., said reactor containing an inert atmosphere and a portion of bromination solvent such that the initial weight percentage of said catalyst expressed as aluminum is in the range of about 0.02 wt % to about 0.04 wt %;

b) within about 2 hours after completing the charge of the catalyst, separate concurrent feeds of (i) bromine, and (ii) a solution of said aromatic polymer composition in the bromination solvent are initiated, said feeds being conducted such that said solution and the liquid bromine are fed to maintain a substantially constant molar ratio of aromatic polymer composition to bromine entering the reactor; and c) wherein on completion of the feeds and an optional ride time of no greater than about 60 minutes, the weight percentage of aluminum relative to the total of the mass of the bromination solvent and the brominated aromatic polymer composition in the reactor is greater than about 0.015 wt %.

Desirably, 1,3-diphenylpropane is present in the above aromatic polymer composition in an amount in the range of not more than about 1 GPC area %, or toluene is present in the above aromatic polymer composition in an amount of not more than about 0.1 GPC area %, or both of 1,3-diphenylpropane and toluene are present in the above aromatic polymer composition in the amounts specified Other important features and advantages of this invention will be still further apparent from the ensuing description, accompanying drawing, and appended claims.

BRIEF DESCRIPTION OF THE FIGURES OF THE DRAWING

FIG. 1 is a plot of two sets of thermal color measurements of brominated aromatic polymer compositions made using different aluminum catalyst concentrations, wherein these respective data sets were obtained at two different temperatures.

FURTHER DETAILED DESCRIPTION OF THE INVENTION

The brominated aromatic polymer compositions formed by the processes of this invention can be represented by the following formula:

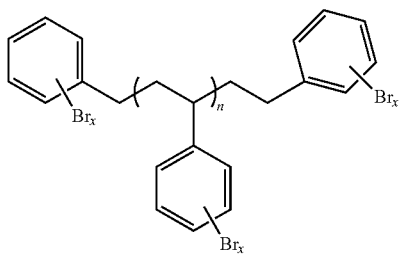

(II)

wherein n is an average number in the range of about 2.5 to about 8 (desirably in the range of about 2.9 to about 3.9, and which when rounded off to whole numbers, becomes an average number in the range of about 3 to about 4), wherein each x is the same or different and is a whole number in the range of 3 to 5, the average number of all of the x's in the composition being in the range of about 3.0 to about 3.8 (desirably in the range of about 3.5 to about 3.8) and the weight percent of bromine as determined by X-Ray Fluorescence Spectroscopy (XRF) in the polymer being in the range of about 70 to about 76 wt % (desirably in the range of about 73.4 to about 74.5 wt %).

Available experimental results indicate that these brominated aromatic polymer compositions provide especially desirable results when produced by bromination, pursuant to this invention, of aromatic polymer compositions of formula (I) as described above, in which n is an average number in the range of about 2.9 to about 3.9, and which when rounded off to whole numbers, becomes an average number in the range of about 3 to about 4, and in which additionally, the aromatic polymer composition is further characterized by having an $M_w$ in the range of about 650 to about 750, an $M_n$ in the range of about 500 to about 600, an $M_z$ in the range of about 830 to about 1120, and a polydispersity in the range of about 1.2 to about 1.35, particularly when in the bromination process of this invention, the solution of the aromatic polymer composition in the bromination solvent is passed through a solid absorbent to remove polar amine impurities prior to being fed into the reaction mass in a manner described herein.

For convenience, the substrates used in the bromination processes of this invention, namely, the aromatic polymer compositions, are often referred to in the singular as "APC" and in the plural as "APC's". Similarly, the brominated aromatic polymer compositions formed in the processes of this invention are often referred to in the singular as "BAPC" and in the plural as "BAPC's".

As regards bromination of polymeric aromatic compounds derived from styrene, it is generally understood that a key process parameter is the molar ratio of aluminum halide catalyst to the total amount of bromine charged during the bromination process. It has now been found, quite unexpectedly, that there are other key process parameters which can exert a profound influence upon the quality of the BAPC's formed in the practice of this invention. Unlike higher molecular weight styrene-derived polymers, which have high viscosities that limit the concentrations in which they can be fed to a reaction mass, the APC's used as substrates in the bromination processes of this invention do not suffer from these viscosity limitations. Consequently, in the development of this invention, it was surprisingly found that additional modes of operations exist that provide BAPC's of superior properties.

More particularly, it has been found that initial color of the BAPC as well as its thermal color performance and other thermal properties, including thermal HBr evolution, are greatly influenced by the catalyst concentration in the reaction mass throughout the course of the bromination reaction. An important trend that was unexpectedly discovered was that at higher catalyst concentrations significant improvements in these color properties were obtained.

Thus, a key feature of the bromination processes of this invention is the manner in which the three reagents involved in the bromination reaction (the APC, the bromine, and the bromination catalyst) are brought together and maintained throughout the course of the reaction. By bringing those reagents together in balanced proportions discovered in the development of this invention, there is provided a kinetic regime that provides a superior BAPC product.

By judicious, previously unchartered selection of the concentration of the APC in the bromination solvent, and the initial concentration of the bromination catalyst in the bromination solvent charged to the reactor, it was found that one can operate the bromination process such that the catalyst concentration varies little during the course of the bromination, despite the fact that the reaction mass is constantly increasing as a result of the substances being brought into the reactor. This has been proven to be a superior mode of operation for use in the practice of this invention.

Hence, unless a suitable relationship among the concentrations of the APC and the catalyst in the bromination solvent is utilized during the process, a process condition can be reached in which catalyst concentration varies significantly over the course of the bromination. Such variations in catalyst concentrations lead to undesired side products when catalyst concentrations are high and can lead to undesired thermal and color properties when catalyst concentrations are low. If both of these conditions are experienced during the bromination, i.e., variance during the bromination from high to low catalyst concentrations during the bromination, a particularly deleterious impact on product purity, quality, and performance is experienced. An example of such would be a very dilute APC feed with a consequent very high initial catalyst concentration—a condition commonly utilized in bromination reactions involving high molecular weight substrates—whereby during the course of the bromination, the catalyst concentration is decreased significantly.

Additionally, if concentrations of the APC and the initial concentration of the bromination catalyst in the bromination solvent are both too high such that a relatively constant, high catalyst concentration exists throughout the course of most, if not all, of the bromination, then the result is undesired cleavage of the APC leading to undesirable impurity content. Conversely, if concentrations of the APC and the initial concentration of the bromination catalyst in the bromination solvent are both too low such that a relatively constant, low catalyst concentration exists throughout the course of most, if not all, of the bromination, then the result is formation of a BAPC having undesired initial color, thermal color, and thermal properties.

As noted above, one important feature of this invention was the unexpected discovery of a trend that at higher catalyst concentrations significant improvements in a number of color and stability properties were obtained. This trend is depicted in FIG. 1. The data points shown in FIG. 1 were developed in two sets of thermal treatments of BAPC samples produced using samples of BAPC materials individually produced in 14 experimental pilot plant runs. These pilot plant runs were conducted under generally similar reaction conditions with minor variations which are the consequence of the different sizes of the volume of the APC feed relative to the volume of the initial reactor charge of catalyst and bromination solvent. As shown, these data points show the relationship between (i)

the solution color of each of the thermally treated BAPC's and (ii) the average aluminum catalyst concentration utilized in each of the corresponding 14 runs. The upper trend line relates to the data obtained at 300° C. thermal treatment of the BAPC samples. The lower trend line relates to the data obtained at 250° C. thermal treatment of the BAPC samples. The details of this these thermal treatments are set forth hereinafter in connection with analytical methods used. In both data sets the experimental results demonstrate that a functional dependence of increased thermal color stability with increased catalyst concentration used in the preparation of the BAPC. From the data presented in FIG. 1, it can be seen that to achieve superior color and superior thermal stability properties, it is best to operate the bromination process such that on average the catalyst weight percentage should be maintained above a threshold level. As one of skill in this art will now appreciate, one should not operate with a catalyst weight percentage that is high enough to cause undesirable degradation of the APC used and/or the BAPC formed. Such degradations have been experienced at aluminum halide catalyst levels in runs in which the initial catalyst loading was as low as 0.2 wt % aluminum chloride in bromochloromethane (BCM) which corresponds to initial 0.04 wt % charge of aluminum halide catalyst, expressed as aluminum. Therefore, pursuant to this invention, the initial weight percentage of the aluminum halide catalyst expressed as aluminum is in the range of about 0.02 wt % to about 0.04 wt %, and on completion of the feeds and an optional ride time of no greater than about 60 minutes, the weight percentage of aluminum relative to the total of the mass of the bromination solvent and the brominated aromatic polymer composition in the reactor is greater than about 0.015 wt %.

In conducting the bromination processes of this invention, the separate concurrent feeds of bromine and a solution of APC are initiated within about 2 hours after completing the charge of the catalyst. Typically, this time period can be one hour or less. On a laboratory scale, this time period can be as short as 30 minutes or less. It is important that the slurry of catalyst in bromination solvent has cooled to the desired initial bromination reaction temperature prior to initiating the feeds. Extended periods of contact of the catalyst in the bromination reaction, i.e., greater than 2 hours prior to initiation of bromination, has resulted in BAPC products having inferior properties.

The catalysts used in the processes of this invention are typically aluminum halide catalysts. Of these, aluminum chloride is most desirable for use in the present processes because of its low cost and ready availability. One skilled in the art would understand that upon entering the reaction mass, the aluminum chloride will undergo halogen exchange reaction leading to complex mixtures of aluminum halides containing bromine atoms with and/or without chlorine atoms. Use of an aluminum tribromide is deemed suitable for the process of this invention. However as it is not an item of commerce, it is a less desirable catalyst.

A variety of bromination solvents are available for use in the processes of this invention. Non-limiting examples of such solvents include methylene bromide, ethylene dibromide, methylene chloride, ethylene dichloride, propyl bromide, and similar halohydrocarbons. Bromochloromethane is a particularly desirable solvent for use in the processes of this invention. Typically, the bromination can be conducted with APC concentrations as low as 10 wt % and as high as 50 wt %, but it is desirable to utilize concentrations in the range of about 20 wt % to about 40 wt %.

A feature of the invention is to limit contact between BAPC product and aluminum halide catalyst in the absence of bromine. Thus, the reaction is typically conducted and quenched as soon as practical, hence, ride times of less than 1 hour, preferably less than 10 minutes, are desirable. Longer ride times provide little benefit in terms of increasing bromine content of the BAPC product and are detrimental to the properties of the BAPC product.

In conducting the bromination, it is highly desirable to ensure that the feeds of bromine and the solution of APC in bromination solvent enter the catalyst-containing reaction mixture in close proximity to each other. This is done to create locally high and balanced concentrations of APC, bromine, and the bromination catalyst. Such feeds can be impinging or non-impinging subsurface feeds. Alternatively, such feeds can be feeds that are introduced above the surface of the reaction mixture, provided that these feeds remain spaced apart until they come in contact with the surface of the reaction mass. The trajectory should be such that the loci of reaction mass surface contact are in close proximity to each other without premature contact with each other. It is understood that in certain reactor configurations the feed can be initially above the surface, but finish below the surface, based on the lengths of the diplegs, injectors, or other liquid feeding means.

Quenching of the reaction mass is typically conducted using water. However, use of aqueous solutions of hydrazine hydrate is more desirable because in addition to quenching the aluminum halide catalyst, the hydrazine hydrate reduces bromine to HBr. Such quenching shortens contact time of the BAPC with bromine and thereby provides a product with superior color and reduced thermal HBr content. Typically, dilute aqueous solutions of hydrazine hydrate in the range of about 0.1 to about 1 wt % are effective quenching media. Amounts outside this range can be used, if desired. In any given case, the amount used should be sufficient to ensure that all elemental bromine is consumed during the quenching operation. In as much as the bromination reaction mixture is typically saturated with HBr which is recovered for recycle, it is desirable to form an aqueous quench mixture having an HBr concentration between 20 and 26 wt %. Therefore, it is desirable to use a charge of about 0.4 part by weight of quench solution per each part by weight of BAPC contained in the reaction mass.

Upon completion of the quenching, and after agitation of the reaction mass has been discontinued, the quenched reaction mass is isolated from the aqueous mixture by means of a phase separation. Suitable methods for effecting this phase separation include use of a simple phase cut, decantation, liquid/liquid centrifugation, or the like. After the phase separation, it is desirable to wash the resultant reaction mass one or more times with fresh water. Such operations can be conducted in a batch or continuous mode.

After the quenching and ensuing washing steps, it is beneficial to agitate the quenched bromination reaction mass with an alkaline borohydride solution to decompose polar bromoamine-derived impurities. This treatment is typically conducted at a temperature in the range of about 25° C. to about 80° C. and for a time period sufficient for the decomposition to be complete, as evidenced by decolorization of the reaction mass and breaking of any emulsion that may exist. Ordinarily, this alkaline borohydride treatment is conducted at a temperature in the range of 25° C. to about 64° C. using a 0.3 to about 1.0 wt % solution of $NaBH_4$ in 5% aqueous NaOH solution. If desired, other alkaline borohydrides may be employed in this operation. However, $NaBH_4$ is particularly desirable because of its ready availability and proven effectiveness, which results in low treatment cost. Upon completion of the treatment, agitation is interrupted and the phases are separated, being careful to remove any rag or emulsion remnants that have migrated to the aqueous organic interface. Failure to do so has resulted in incorporation of impurities in the BAPC that have been shown to lead to poor thermal color performance.

The following Examples illustrate the preparation of the APC used in the conducting a bromination process in accordance with this invention, in one case (Example 1) using fresh toluene and N,N,N',N'-tetramethylethylenediamine (TMEDA) and in a second case (Example 2) using a mixture of fresh toluene and TMEDA together with some recycled toluene which contains recovered and recycled TMEDA. Also shown (Example 3) is a blending operation in which wiped film evaporation is used for removing volatile components (toluene, TMEDA, and 1,3-diphenylpropane) from the APC. Bromination of the APC pursuant to the process technology of this invention is illustrated by Example 4. These Examples are presented for illustrative purposes and are not intended to limit, nor should they be interpreted as limiting, the scope of this invention to only the specific details set forth therein.

EXAMPLE 1

Preparation of an APC Substrate for Bromination

In this operation, fresh toluene as well as other fresh reactants were used. A glass-lined, 100-gallon jacketed reactor equipped with an overhead condenser, submerged thermal well/thermal couple and a bottom drain valve. Temperature was maintained at a set point by controlling the temperature of the water flowing through the jacket using a steam control valve. Vigorous agitation was accomplished by means of a three-blade, retreat-curve agitator on a variable speed drive. The reactor is essentially free of all wetted PTFE parts or other polymeric fluorinated materials or elastomers.

The reactor was maintained under an inert dry $N_2$ atmosphere during all operations. The reactor was charged with the chain transfer agent(s) through a dip leg by means of pressure transfer from a portable tank. Alkyl lithium, additional solvents and the amine promoter (TMEDA) were all fed subsurface to the stirred chain transfer agent(s) through the same dip leg. Styrene was pressure transferred from a portable, pressure vessel by means of a metering valve through a 24" cylindrical column (3" dia.≈6 lbs.) of 3 Å mol sieves (Zeochem) and delivered as a fine stream or spray above the surface of the reaction mixture through a slit feed nozzle.

Toluene 140 pounds, (689 mol) was charged to the reactor; Karl Fischer moisture analysis indicated 7 ppm residual $H_2O$. Agitation began. The solvent was heated to 78° C. by applying tempered water to the vessel jacket. Upon reaching the set point temperature, 4.6 pounds of TMEDA (18.0 mol), in 10 pounds of toluene (49.24 mol) was charged to the reactor through the dip leg below the surface of the agitated toluene reaction mixture. The feed line was then flushed with 20 pounds (98 mol) of anhydrous toluene. Next, 4.4 lb n-BuLi solution (23.5 wt % in cyclohexane) (7.32 mol n-BuLi) was charged through the subsurface feed line forming the characteristic bright red-orange color of TMEDA complexed benzyl lithium anion with concomitant off gassing of butane. The feed line was then flushed with 22 pounds (108 mol) of anhydrous toluene. 436 lb of styrene (99+%, 1899 mol, American Styrenics) were fed over 153 minutes. The styrene was added by means of pressure transfer from a nitrogen regulated portable tank through a metering valve at a constant feed rate of 2.84 lb/min. The reactor was allowed to ride for 5 minutes to make certain the reaction was complete.

The reaction mixture was quenched at 70° C. with 10 gallons of 0.75 wt % ammonium chloride solution which had been deoxygenated overnight by sparging with nitrogen gas. The reaction mixture was washed two more times with 10 gallons of deoxygenated water. Phase cuts were rapid and required little settling time. Water and any rag or emulsion was removed through the bottom drain valve. A sample of the washed crude reaction mixture was analyzed by GPC ($M_p$: 312, $M_n$: 466, $M_w$: 673, $M_z$: 934, polydispersity (PD): 1.44).

The reactor was heated to atmospheric boiling point using tempered water on the vessel jacket. Steam was then applied to the reactor jacket to increase the temperature of the reactor jacket to 140° C. Cyclohexane, residual moisture and toluene boiled, condensed in the overhead condenser, and drained to a drum until a pot temperature of 135° C. was observed. The reactor was cooled to 50° C. Vacuum was applied to the vessel and the reactor was heated to boiling point. Steam was then applied to the reactor jacket to increase the temperature of the reactor jacket to 140° C. Vacuum was used to decrease the reactor pressure to 35 mm Hg. Cyclohexane, residual moisture and toluene boiled, condensed in the overhead condenser, and drained to a drum until a pot temperature of 135° C. was observed. An aliquot was removed from the reactor for analysis via GPC ($M_p$: 314, $M_n$: 468, $M_w$: 676, $M_z$: 940, polydispersity (PD): 1.44). The reaction mass (557 lbs) was collected in a 350-gallon tote bin.

EXAMPLE 2

Partial Use of Recycled Toluene to Form Crude APC, a Precursor Material for WFE Treatment In this Example, a portion of a composite composed predominately of toluene, TMEDA, cyclohexane, and 1,3-diphenylpropane recovered from prior runs was used. Thus, this Example demonstrates use of recycled toluene as part of the total toluene charged.

Fresh toluene 40 pounds, (197 mol) and 97 lb of recycled toluene (containing 97.1%, 94.2 lb, 464 mol toluene; 1.7%, 1.6 lb, 6.2 mol TMEDA; 0.3%, 0.3 lb, 0.7 mol, 1,3-diphenlypropane; 0.9%, 0.9 lb, 4.9 mol cyclohexane) was charged to the reactor; Karl Fischer moisture analysis indicated 7 ppm residual $H_2O$. Agitation began. The solvent was heated to 79° C. by applying tempered water to the vessel jacket. Upon reaching the set point temperature, 3.6 pounds of fresh make-up TMEDA (12.8 mol), in 10 pounds of toluene (49.24 mol) was charged to the reactor through the dip leg below the surface of the agitated toluene reaction mixture. The feed line was then flushed with 20 pounds (99 mol) of anhydrous toluene. Next, 4.4 lb n-BuLi solution (23.6 wt % in cyclohexane) (7.4 mol n-BuLi) was charged through the subsurface feed line forming the characteristic bright red-orange color of TMEDA complexed benzyl lithium anion with concomitant off gassing of butane. The feed line was then flushed with 22 pounds (108 mol) of anhydrous toluene. 432 lb of styrene (99+%, 1881 mol, American Styrenics) were fed over 150 minutes. The styrene was added by means of pressure transfer from a nitrogen regulated portable tank through a metering valve at a constant feed rate of 2.88 lb/min. The reactor was allowed to ride for 5 minutes to make certain the reaction was complete.

The reaction mixture was quenched at 70° C. with 10 gallons of 0.75 wt % ammonium chloride solution which had been deoxygenated overnight. The reaction mixture was washed with a second 10 gallons of deoxygenated water. Phase cuts were rapid and required little settling time. Water and any rag or emulsion was removed through the bottom drain valve. A sample of the washed crude reaction mixture was analyzed by GPC ($M_p$: 303, $M_n$: 462, $M_w$: 677, $M_z$: 959, PD: 1.47).

The reactor was heated to atmospheric boiling point using tempered water on the vessel jacket. Steam was then applied to the reactor jacket to increase the temperature of the reactor jacket to 140° C. Cyclohexane, residual moisture and toluene boiled, condensed in the overhead condenser, and drained to a drum until a pot temperature of 135° C. was observed. The reactor was cooled to 50° C. Vacuum was applied to the vessel and the reactor was heated to boiling point. Steam was then applied to the reactor jacket to increase the temperature of the reactor jacket to 140° C. Vacuum was used to decrease the reactor pressure to 35 mm Hg. Cyclohexane, residual moisture and toluene boiled, condensed in the overhead condenser, and drained to a drum until a pot temperature of 135° C. was observed. An aliquot was removed from the reactor for analysis via GPC ($M_p$: 301, $M_n$: 459, $M_w$: 672, $M_z$: 950, PD: 1.46). The reaction mass (544 lbs) was collected in a 350-gallon tote bin.

EXAMPLE 3

Blending of Crude APC Batches and WFE Purification of the Blend to Form APC

A total of 12 all fresh runs were made following the general procedure of Example 1 above with the $M_n$ after the vacuum strip ranging from 403 to 483 and an $M_w$ ranging from 566 to 721. A total of 13 recycled toluene runs were made following the general procedure of Example 2 above with the $M_n$ after the vacuum strip ranging from 404 to 463 and an $M_w$ ranging from 568 to 688. Possible causes of these ranges are small variations in the temperature, stirring speed or feed rate. The 12 all fresh runs were combined with the 13 recycle runs and run through an industrial size wiped film evaporator (WFE), a sample was analyzed by GPC: ($M_p$: 413, $M_n$: 552, $M_w$: 693, $M_z$: 878, PD: 1.26). A five-gallon sample of the composite was stripped in the laboratory giving a very similar result: ($M_p$: 418, $M_n$: 569, $M_w$: 729, $M_z$: 946, PD: 1.28).

EXAMPLE 4

Preparation of BAPC Solutions

Fourteen batches of APC's formed as in Example 3 in the form of solutions in BCM were individually brominated in a 50-gallon glass-lined, jacketed vessel capable of using ethylene glycol for heat exchange (heating or cooling) or steam for heating. The reactor was equipped with a pitched-blade glass-lined agitator with a nitrogen seal. Both batch reactions had a target reaction feed time of about 3 hours, a target reaction temperature between −2 to 2° C. with a targeted final bromine concentration of 74±0.5 wt %. The bromination reaction involved separately and concurrently feeding bromine and the APC over a three hour period. The ratio of the APC to bromine was held constant and closely monitored throughout the reaction to create a final product with a specified bromine concentration. After feeding was complete, the reaction mass was held in the reactor for 45 minutes while the temperature was brought up to ~6° C. Any excess bromine in the reaction mass was quenched with water. This was followed by a water wash, and then another wash using a caustic and sodium borohydride solution at ~60° C. to neutralize remaining HBr. The presence of sodium borohydride in the wash solution is deemed to break down aminic compounds present in the reaction mass that can form color bodies in the final isolated product. The reaction mass is finally washed again with water to a neutral pH.

Bromine was fed via pressure transfer from a stainless steel 5-gallon milkcan lined with Teflon® PFA resin (a perfluoroalkoxy copolymer resin; DuPont), the resin being hereinafter referred to as PFA. The milkcan used is 9" ID, 14" tall without the liner, with a 0.22" thick lining around the entire internal surface area of the can. Including the lining, the actual fill volume of the can is ~4.6 gallons. The can is equipped with a ⅜" PFA dipleg, and 3 additional ½" ports that were used for nitrogen pressure, a PSD with holder, and venting down. A 2" center port on the can had a PFA plug secured with a Nitronic 60 nut.

There were two feed diplegs used in these reactions. The first dipleg is a solid pipe of Teflon® fluoropolymer, with 2×¼" holes drilled through the entire length of the pipe. There is ¼" PFA tubing run from top to bottom of each of the void spaces, which are spread ¾" apart. The tubing is secured in place at each end with drilled-through pipe-to-tubing male connectors and PFA nuts/ferrules. The other dipleg is similar in shape, but has ⅜" drilled through fittings on the top flange, with 2×⅜" tubing runs extending through the void space of a hollow pipe of Teflon® fluoropolymer. The tubing connects ~20 inches down via PFA fittings to the top of a solid mixing nozzle made of Teflon® fluoropolymer. This nozzle is screwed into threads on the inside of the pipe of Teflon® fluoropolymer, and impinges the two feeds before they enter the reactor through a ⅛" hole at the bottom of the nozzle. Both diplegs are ~24" in length from the bottom flange of the dipleg, and extend into the reactor approximately 2" above the tip of the agitator blades.

Catalyst was introduced to the reactor through a charge bomb composed of a 1" stainless steel (SS) block valve, a 1×1½" SS reducer, and a 1½" full port SS-lined brass block valve. The catalyst charge to the bomb was performed in a $N_2$ purged glove box, through the 1.5" full port valve. Following the charge, a ½" SS tee was fitted to the top of the 1.5" valve to attach a pressure gauge and to charge $N_2$ to the bomb. The entire setup screwed onto a reducing flange on a reactor nozzle via the 1" block valve.

Aqueous phase cuts were all conducted using a PFA dipleg. It was a length of ½" PFA tubing that was straightened out, and grooved at the end to hold PFA ferrules in place. The ferrules allowed for the tubing to be pushed down and lowered into the reactor for decanting the aqueous phase, but prevented the tubing from coming out of the reactor beyond the drilled through PFA fitting and cap that held the tubing in place. The dipleg tubing ran from the reactor, straight to a box made from Plexiglas® resin that was used for sampling the aqueous material during cuts. There were deliberately no fittings between the dipleg nozzle at the reactor and this sample point to lower the risk of aqueous exposure related to additional points of failure present in the line.

Table 1 summarizes for each of batch bromination reactions 1-14 (BAPC 1-14), the components, the amounts thereof used, the catalyst weight percent loadings, and the color characteristics, thermal properties, and bromine levels of lab scale isolated smaller sample batches of the BAPC solids.

TABLE 1

| | BAPC Example | | | | | | |
|---|---|---|---|---|---|---|---|
| | 1 | 2 | 3 | 4 | 5 | 6 | 7 |
| Charges | | | | | | | |
| BCM lbs | 295 | 289.4 | 290 | 290 | 290 | 290 | 290.2 |
| AlCl$_3$ lbs | 0.245 | 0.245 | 0.245 | 0.260 | 0.282 | 0.298 | 0.298 |
| APC in BCM lbs | 75.1 | 70.1 | 66.8 | 72.6 | 68.8 | 72.7 | 75.6 |
| wt % APC | 26 | 26 | 26 | 26 | 26 | 26 | 26 |
| APC fed lbs | 19.5 | 18.2 | 17.4 | 18.9 | 17.9 | 18.9 | 19.7 |
| Bromine | 104.0 | 99.7 | 95.9 | 103.8 | 104.1 | 103.9 | 105.4 |
| BAPC (lbs est.) | 71.5 | 68.1 | 65.3 | 70.8 | 69.9 | 70.9 | 72.4 |
| Total Mass (100% HBr evolved) | 366 | 357 | 355 | 360 | 359 | 360 | 362 |
| Initial AlCl$_3$ wt % | 0.083% | 0.085% | 0.084% | 0.090% | 0.097% | 0.103% | 0.103% |
| Final AlCl$_3$ wt % (est.) | 0.067% | 0.069% | 0.069% | 0.072% | 0.079% | 0.083% | 0.082% |
| Avg. AlCl$_3$ wt % (est.) | 0.075% | 0.077% | 0.077% | 0.081% | 0.088% | 0.093% | 0.092% |
| Hunter Color YI | 4.78 | 4.58 | 4.44 | 13.62 | 4.24 | 5.39 | 4.27 |
| Results | | | | | | | |
| Solution Color (Delta E) | 1.82 | 1.60 | 1.57 | 3.44 | 1.27 | 1.79 | 1.64 |
| Thermal color 250° C. | 11.83 | 12.94 | 13.69 | 13.75 | 10.40 | 10.15 | 11.35 |
| Thermal color 300° C. | 22.45 | 22.73 | 22.72 | 19.52 | 19.15 | 19.93 | 20.48 |
| Thermal HBr (ppm) | 167 | 106 | 110 | 171 | 118 | 198 | 139 |
| T$_g$ (° C.) | 117.34 | 122.42 | 132.77 | 107.05 | 120.88 | 115.93 | 125.48 |
| Wt % Br | 73.6 | 74.2 | 75.1 | 72.5 | 73.9 | 73.6 | 74.4 |

| | BAPC Example | | | | | | |
|---|---|---|---|---|---|---|---|
| | 8 | 9 | 10 | 11 | 12 | 13 | 14 |
| Charges | | | | | | | |
| BCM lbs | 290.2 | 225 | 225 | 226.2 | 215 | 225 | 225 |
| AlCl$_3$ lbs | 0.293 | 0.289 | 0.291 | 0.290 | 0.290 | 0.294 | 0.294 |
| APC in BCM lbs | 78 | 71.7 | 71.1 | 69.8 | 56 | 69.5 | 73.3 |
| Wt % APC | 26 | 28 | 28 | 28 | 36 | 28 | 26 |
| APC fed lbs | 20.3 | 20.1 | 19.9 | 19.5 | 20.2 | 19.5 | 19.1 |
| Bromine | 104.4 | 108.6 | 108.6 | 107.0 | 110.3 | 106.4 | 104.4 |
| BAPC (lbs est) | 72.5 | 74.4 | 74.2 | 73.0 | 75.3 | 72.7 | 71.3 |
| Total Mass (100% HBr evolved) | 362 | 299 | 299 | 299 | 290 | 297 | 296 |
| Initial AlCl$_3$ wt % | 0.101% | 0.128% | 0.129% | 0.128% | 0.135% | 0.131% | 0.131% |
| Final AlCl$_3$ wt % (est) | 0.081% | 0.097% | 0.097% | 0.097% | 0.100% | 0.099% | 0.099% |
| Avg. AlCl$_3$ wt % (est) | 0.091% | 0.113% | 0.113% | 0.113% | 0.117% | 0.115% | 0.115% |
| Results | | | | | | | |
| Hunter Color YI | 4.72 | 4.28 | 4.3 | 4.13 | 3.62 | 4.81 | 5.27 |
| Solution Color (Delta E) | 1.78 | 1.06 | 1.55 | 1.36 | 1.10 | 2.00 | 2.72 |
| Thermal color 250° C. | 10.61 | 6.00 | 7.00 | 7.04 | 6.28 | 8.30 | 8.60 |
| Thermal color 300° C. | 20.42 | 12.85 | 12.43 | 15.74 | 17.07 | 17.26 | 19.8 |
| Thermal HBr (ppm) | 148 | 138 | 225 | 135 | 63 | 100 | 97 |
| T$_g$ (° C.) | 121.04 | 121.33 | 120.43 | 127.68 | 125.38 | 123.86 | — |
| Wt % Br | 73.9 | 74 | 74 | 74.6 | 73.4 | 74.1 | 74 |

Example 5 illustrates desirable precipitation procedures. The procedure used in forming Blend 4 also illustrates a novel treatment procedure of this invention that can be utilized during BAPC recovery to further improve its initial and thermal color properties.

EXAMPLE 5

Precipitation Procedure

A 30-liter oil-jacketed glass reactor was fitted with for distillation, and was equipped for mechanical stirring using a Teflon® fluoropolymer pitched-blade impeller (reversed pitch to pump against vortex) and a ⅛" subsurface feed line made of Teflon® fluoropolymer. The reactor is charged with 24 liters of water and heated to 98° C. A 10 liter stainless milk can was charged with 17 kg of an 18 wt % BAPC solution. The content of the milk can pressure transferred to precipitation medium through the ⅛ inch feed line over a period of 2.5 hours and at a pot temperature in the range of about 94-96° C. Upon completion of the feed the reactor is allowed to warm to 99° C. and held at that temperature for 5 minutes. The content of the reactor is then cooled to about 60° C. and the slurry is drained through a bottom drain valve into five 2-gallon polyethylene carboys.

The solid BAPC was isolated using a Rousselet Robatel 12-inch basket centrifuge initially operating at 950 rpms. Upon completion of the initial centrifugation the speed is increased to 1700 rpms to ring out the cake. The solid (about 4 kgs of wetcake) is collected and placed in Pyrex® borosilicate glass drying trays and dried in a nitrogen purged oven for 36 hours at 105° C., then further dried at 105° C. under full vacuum for 6 hours. The procedure typically yields 3 kg of a dry free flowing white powder.

Table 2 summarizes the complete analytical results on four Kilo Lab scale (30-liter reactor) precipitations of BAPC blends formed from selected batches made in Example 4. Comparison of improved thermal color for Blend 4 relative to Blend 3 demonstrates the benefits of having, pursuant to this invention, some level of NaBH$_4$ present in the precipitation solvent (water) during the isolation procedure. In addition, Table 2 shows the components used in making the selected batches.

TABLE 2

| | Large Scale Precipitation | | | |
|---|---|---|---|---|
| | 1 | 2 | 3 | 4 |
| BAPC Blend | 1 and 2 | 3 and 5 | 3, 5 and 9 | 3, 5 and 9 |
| Approx. Blend Ratio | 50:50 | 50:50 | 25:25:50 | 25:25:50 |
| Residual BCM (ppm) | 52 | 32 | <1 | <1 |
| Sodium borohydride present in precipitator (ppm) | 0 | 0 | 0 | 250 |
| Residual DBM (ppm) | 0 | 0 | <1 | <1 |
| Residual H2O (ppm) | 141 | 83 | 49 | 62 |
| XRF wt % Br | 74.2 | 74.8 | 74 | 74.4 |
| Tg (° C.) (DSC) | 120.13 | 128.47 | 124.46 | 124.5 |
| TGA | | | | |
| 1% Wt. Loss (° C.) | 321.15 | 322.73 | 321.98 | 328.25 |
| 5% Wt. Loss (° C.) | 356.99 | 355.56 | 357.82 | 360.21 |
| 10% Wt. Loss (° C.) | 370.21 | 369.48 | 370.35 | 372.27 |
| 50% Wt. Loss (° C.) | 406.66 | 406.78 | 406.23 | 406.72 |
| Thermal HBr 300° C. (ppm) | 152 | 116 | 126 | 10 |
| GPC | | | | |
| M$_w$ | 2637 | 2640 | 2569 | 2569 |
| M$_n$ | 1951 | 1958 | 1907 | 1907 |
| M$_z$ | 3903 | 3873 | 3808 | 3808 |
| PD | 1.352 | 1.348 | 1.347 | 1.347 |
| Color (Solids) | | | | |
| L | 95.94 | 95.8 | 90.22 | 90.06 |
| a | −0.09 | −0.31 | −1.13 | −1.11 |
| b | 2.18 | 2.02 | 2.48 | 2.35 |
| YI | 3.99 | 3.54 | 4.01 | 3.77 |
| Color (Solution) | | | | |
| L | 99.53 | 99.81 | 99.65 | 99.59 |
| a | 0.03 | −0.12 | −0.13 | −0.12 |
| b | 1.44 | 1.03 | 1.07 | 0.98 |
| Delta E | 1.65 | 1.17 | 1.29 | 1.25 |
| Thermal Color | | | | |
| 250° C./15 min | 10.19 | 10.48 | 8.46 | 6.32 |
| 300° C./20 min | 18.62 | 19.74 | 20.73 | 17.62 |

Analytical Methods

Except for thermal color analysis, applicable analytical methods for assaying properties of APC's and BAPC's are set forth in International Publication Number WO 2008/154453 A1 having an International Publication Date of 18 Dec. 2008. The procedure for thermal color analysis is as follows: A custom made metal heating block from J-Kem Scientific (St. Louis, Mo.) featuring 12 heating ports with diameters to snuggly fit 20 ml flat bottom scintillation vials is used. The heating block is placed in a in a nitrogen-purged glove box and heated to the test temperature (either 250 or 300° C.).

Duplicate 5-gram samples of the BAPC powder are placed in 20 ml scintillation vials to be heat treated in the heating block. The material in the vials are heated for the specified time (15 minutes at 250° C. or 20 minutes at 300° C.). Upon completion of the heat treatment or thermal aging period, the samples are immediately removed from the block and cooled under nitrogen. The samples are dissolved to make a 10 wt % solution in chlorobenzene. The solution color is of the dissolved sample in terms of L, a, b and Delta E is measured and compared to a chlorobenzene blank standard (L=100, a=0, b=0) using a Hunter Lab ColorQuest XE Colorimeter (Reston, Va.).

The invention may comprise, consist, or consist essentially of the materials and/or procedures recited herein.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text expressly indicates otherwise.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

The invention claimed is:

1. A process which comprises brominating an aromatic polymer composition of the formula:

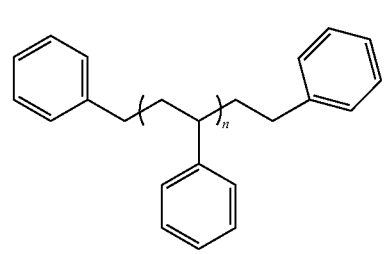

(I)

wherein for each molecule of formula (I), n is an average number in the range of about 2.5 to about 8 with the proviso that 1,3-diphenylpropane, a compound of formula (I) in which n is 0, optionally is present in this aromatic polymer composition in an amount of not more than about 1 GPC area %, and with the further proviso that this aromatic polymer composition optionally further contains toluene in an amount of not more than about 0.1 GPC area %, to form a brominated aromatic polymer composition having a bromine content as determined by XRF in the range of about 70 to about 76 wt %, which process comprises brominating said aromatic polymer composition with liquid bromine in the presence of an aluminum halide bromination catalyst and in the absence of light, at a bromination temperature in the range of about −10° C. to about +5° C., and in which the molar ratio of total amount of bromine fed:total amount of catalyst fed is in the range of 200:1 to about 500:1, which process is further characterized in that:

a) the total amount of said catalyst is charged into a reactor which is at a temperature in the range of about −25° C. to about 0° C., said reactor containing an inert atmosphere and a portion of bromination solvent such that the initial weight percentage of said catalyst expressed as aluminum is in the range of about 0.02 wt % to about 0.04 wt %;

b) within about 2 hours after completing the charge of the catalyst, separate concurrent feeds of (i) bromine, and (ii) a solution of said aromatic polymer composition in the bromination solvent are initiated, said feeds being conducted such that said solution and the liquid bromine are fed to maintain a substantially constant molar ratio of aromatic polymer composition to bromine entering the reactor; and c) wherein on completion of the feeds and an optional ride time of no greater than about 60 minutes, the weight percentage of aluminum relative to the total of the mass of the bromination solvent and the brominated aromatic polymer composition in the reactor is greater than about 0.015 wt %.

2. A process as in claim 1 further characterized in that said solution of said aromatic polymer composition in the bromination solvent is a solution containing about 20 to about 40 wt % of said aromatic polymer composition.

3. A process as in claim 2 further characterized in that said bromination solvent is at least predominately bromochloromethane.

4. A process as in claim 1 further characterized in that upon completion of the feed or of the optionally used ride time, the bromination reaction mass is transferred to a reaction vessel containing a dilute solution of hydrazine hydrate in water and the resultant mixture is agitated so that the catalyst and bromine are quenched.

5. A process as in claim 4 wherein said dilute solution is a 0.1 to 1.0 wt % solution of hydrazine hydrate in water.

6. A process as in claim 5 wherein the amount of said 0.1 to 1.0 wt % solution of hydrazine hydrate in water is about 0.4 parts by weight of said solution per each pound by weight of brominated aromatic polymer composition present in the bromination reaction mass.

7. A process as in claim 4 further characterized in that upon completion of the quenching, the agitation is discontinued, the quenched reaction mass is isolated from the aqueous mixture by means of a phase separation, and optionally, the resultant reaction mass is washed with fresh water.

8. A process as in claim 4 further characterized in that the quenched bromination reaction mass is further treated by agitating the quenched bromination reaction mass with an alkaline borohydride solution to decompose polar bromoamine-derived impurities, said treatment being at a temperature in the range of about 25° C. to about 80° C. and for a time period sufficient for the decomposition to be complete, as evidenced by decolorization of the reaction mass and breaking of any emulsion that may exist.

9. A process as in claim 4 further characterized in that the brominated aromatic polymer composition is recovered from the reaction mass by precipitation from near boiling or boiling hot water in the presence of alkaline borohydride, and wherein optionally, prior to said precipitation the reaction mass is dried azeotropically and passed through a solid absorbent to remove polar impurities.

10. A process as in claim 1 wherein the aluminum halide bromination catalyst as charged into the reactor is aluminum chloride.

11. A process as in claim 1 wherein said feeding is further characterized in that the feeds of bromine and said solution of aromatic polymer composition are in close proximity to each other.

12. A process as in claim 11 wherein said feeds are impinging or non-impinging subsurface feeds.

13. A process as in claim 11 wherein said feeds are spaced apart and are non-impinging feeds to the surface of the reaction mass.

14. A process as in claim 1 wherein n is an average number in the range of about 2.9 to about 3.9 and wherein said bromine content as determined by XRF is in the range of about 73.4 to about 74.5 wt %.

15. A process as in claim 14 wherein said aromatic polymer composition has an $M_w$ in the range of about 650 to about 750, an $M_n$ in the range of about 500 to about 600, an $M_z$ in the range of about 830 to about 1120, and a polydispersity in the range of about 1.2 to about 1.35.

16. A process as in claim 1 wherein the solution of the aromatic polymer composition in the bromination solvent is passed through a solid absorbent to remove polar amine impurities prior to feeding.

17. A process as in claim 1 wherein (i) 1,3-diphenylpropane is present in said aromatic polymer composition in an amount in the range of not more than about 1 GPC area %, or (ii) toluene is present in said aromatic polymer composition in an amount of not more than about 0.1 GPC area %, or (iii) both of 1,3-diphenylpropane and toluene are present in said aromatic polymer composition in the amounts specified.

* * * * *